Nov. 20, 1962  D. C. HEITSHU  3,065,033
SILO UNLOADER

Filed Oct. 4, 1961  2 Sheets-Sheet 1

INVENTOR.
DANIEL C. HEITSHU
BY Walter V. Wright
AGENT

Nov. 20, 1962 D. C. HEITSHU 3,065,033
SILO UNLOADER

Filed Oct. 4, 1961 2 Sheets-Sheet 2

INVENTOR.
DANIEL C. HEITSHU
BY Walter V. Wright

AGENT

United States Patent Office 3,065,033
Patented Nov. 20, 1962

3,065,033
SILO UNLOADER
Daniel C. Heitshu, Shippensburg, Pa., assignor to Sperry Rand Corporation, New Holland, Pa., a corporation of Delaware
Filed Oct. 4, 1961, Ser. No. 142,857
7 Claims. (Cl. 302—56)

This invention relates to mechanism for automatically discharging silage from a conventional silo.

Conventional silos are provided with a plurality of discharge, or access, openings arranged in a vertical column in the side of the silo. These openings are commonly provided with doors which may be removed from outside the silo for the purpose of entering the silo and discharging silage through the openings. The openings are approximately twenty by twenty-six inches in size. The twenty-six inch dimension is that of the vertical sides of the openings.

Prior to the invention of mechanical silo unloaders, which are now well known in the art, the farmer had to climb and enter the silo each time he needed silage and manually throw out the required amount. In recent years, mechanical silo unloaders have greatly improved upon the manual method of discharging silage.

As is well known, mechanical silo unloaders commonly comprise mechanism which rotates about the axis of the silo, gathering material from the surface of the silage and propelling the material through a conduit which is directed at one of the silo access openings. A torque bar extends from the base of the conduit to the column of access openings and has its outer end clamped to the sill of one of the openings. The conduit is supported from, and held against rotation within the silo, by the torque bar. The silo unloaders are usually either suspended from the top of the silo or supported directly on the surface of the silage. As material is discharged from the silo, the level of the silage therein becomes lower and the silo unloader drops therewith to maintain its relationship with the surface of the silage. Each time the surface of the silage drops in the neighborhood of twenty-six inches, or the vertical dimension of one access opening, the farmer must climb the silo and manually lower the discharge conduit and its supporting torque bar to the next lower opening. A conventional fifty foot silo may have twenty or more of these discharge openings. This means that in the process of emptying the silo, even with a mechanical unloader, the farmer must climb the silo twenty times and manually move the torque bar and the heavy discharge conduit to the next lower opening. This is a somewhat hazardous, time-consuming operation involving relatively heavy lifting.

It is an object of this invention to provide an improved silo unloader wherein the number of times that a farmer must climb the silo is reduced by approximately two-thirds below that required for conventional silo unloaders.

It is a further object of this invention to eliminate completely the labor associated with manually lowering the discharge conduit of a silo unloader.

It is another object of this invention to provide an improved silo unloader which may be employed in existing conventional silos without modification thereto.

Another object of this invention is to eliminate the torque bar and its associated clamping and conduit supporting structure from the silo unloader without eliminating the functions performed thereby.

It is another object of this invention to provide improvements in mechanical silo unloaders which may be added to conventional existing mechanisms.

These and other objects of the invention will become more apparent from the specification and drawings, wherein.

Figure 2:
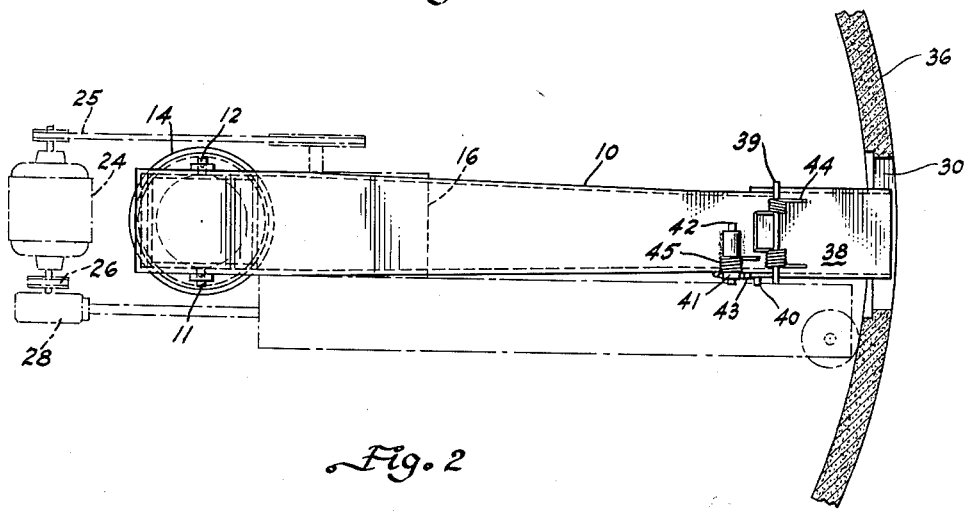
FIG. 2 is a plan view of the mechanism of FIG. 1.

With reference to the drawings, the numeral 10 indicates the discharge conduit of a silo unloader. One end of conduit 10 is mounted for pivotal movement in a vertical plane about horizontal, coaxial pivot members 11 and 12 (FIG. 2). Pivot means 11 and 12 are carried by an annular support member 14. The center of support member 14 coincides as nearly as possible with the vertical axis 15 of the silo.

The numeral 16 indicates a silage blower unit having a discharge pipe 18 which is mounted on support 14 for rotation relative thereto about the vertical axis 15 of the silo. An auger 19 rests on the surface 20 of the silage and has a discharge end 21 adjacent the inlet 22 of blower 16. Blower 16 and auger 19 are driven, respectively, from motor 24 by an endless belt 25, and endless belt 26 and gearbox 28.

Figure 1:
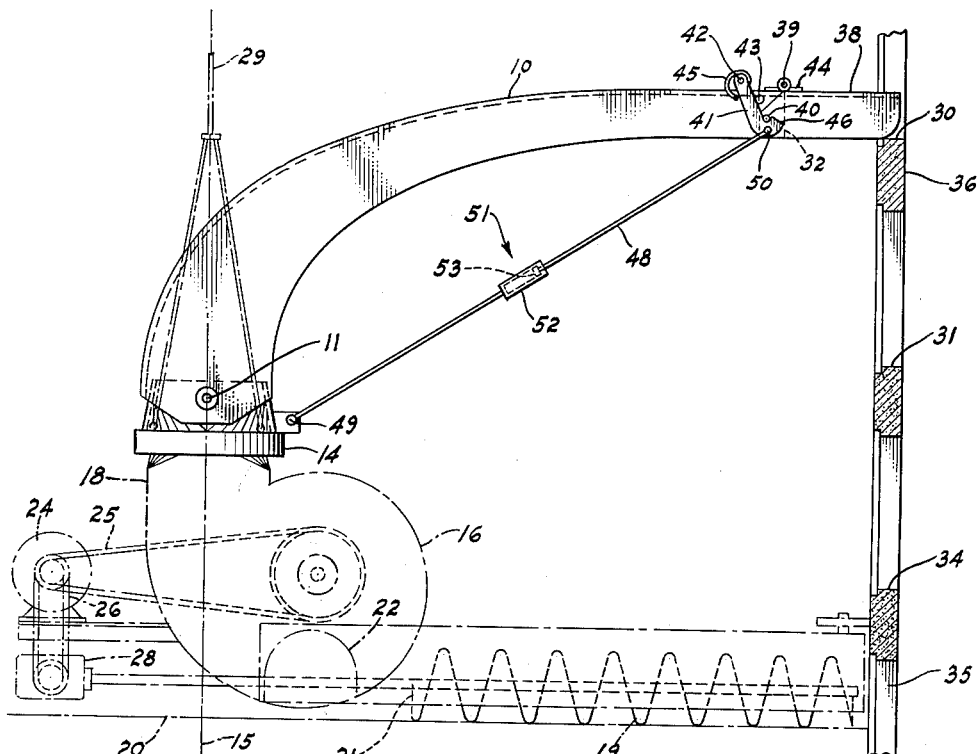
FIG. 1 is a side elevational view showing, diagrammatically, a silo unloader equipped with the improvements of this invention and the relationship thereof to side wall of a conventional silo.

The silo unloader shown diagrammatically in FIG. 1 is of the suspended type. A cable 29 is attached to annular support 14 and extends to the top of the silo where it is attached to a windlass, or the like (not shown). Thus, the weight of the apparatus is supported by cable 29 and the unloader is lowered by cable 29 as silage is discharged and the surface thereof becomes lower in the silo.

The operation is as follows:

Auger 19 gathers silage and deposits it at inlet 22 of blower 16. The blower propels this silage through conduit 10 and out discharge opening 30 in the side wall 36 of the silo. Means, not shown, rotates the blower, auger and drive means 24, 25, 26 and 28 in a horizontal plane about vertical axis 15 of the silo in order that auger 19 may sweep over the entire surface of the silage. Conduit 10, however, does not rotate; it remains directed at the vertical column of discharge openings. This is possible due to the mounting of blower discharge pipe 18 for rotation within support 14.

It is to be understood that so far as this invention is concerned, the above structure and operation is conventional and merely exemplary of the environment to which this invention pertains. The silo unloader could be of the type which is supported on the surface of the silage instead of being suspended from cable 29. The gathering means may be a pair of augers instead of a single auger 19; or, other gathering means such as endless chains may be employed.

This invention relates to improvements in discharge conduit 10 and it is not intended that the invention be limited to the particular gathering and propelling means shown diagrammatically in FIGS. 1 and 2.

As seen in FIG. 1, conduit 10 has a discharge end 32 disposed adjacent the vertical column of openings 30, 31, 34 and 35 in side wall 36 of the silo. The conduit 10 is supported on the sill of opening 30 by a latch member 38 in such position that material propelled through conduit 10 by blower 16 will pass through opening 30 to the outside of silo wall 36. The latch member 38 normally prevents conduit 10 from dropping clockwise (FIG. 1) about members 11 and 12. It also prevents conduit 10 from rotating within the silo with the gathering means and blower; since it engages the openings in the silo wall. Latch member 38 preferably takes the form of a spout of inverted U-shaped cross section. The spout, or latch member, 38 is connected to the top of conduit 10 at the discharge end 32 for vertical pivotal movement about a pivot member 39. A pin 40 is carried by spout 38 in position to be engaged by a locking hook 41. Hook 41 is pivotally connected to conduit 10 by a pivot member 42 (see FIG. 2). The hook 41 normally engages pin 40, thereby locking latch member 38 in the position seen in FIG. 1 relative to conduit 10. Means, such as the stop pin 43 carried by conduit 10, is provided to limit the extent of counterclockwise movement of locking hook 41.

Figure 3:
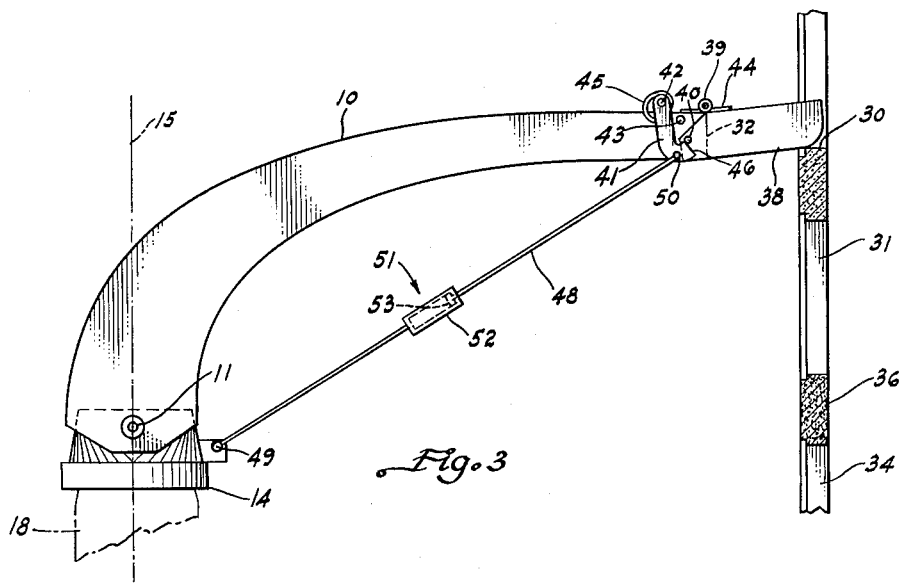
FIG. 3 is a fragmentary elevational view similar to FIG. 1 but showing the movable parts of the mechanism of this invention in a slightly different position.
Figure 4:
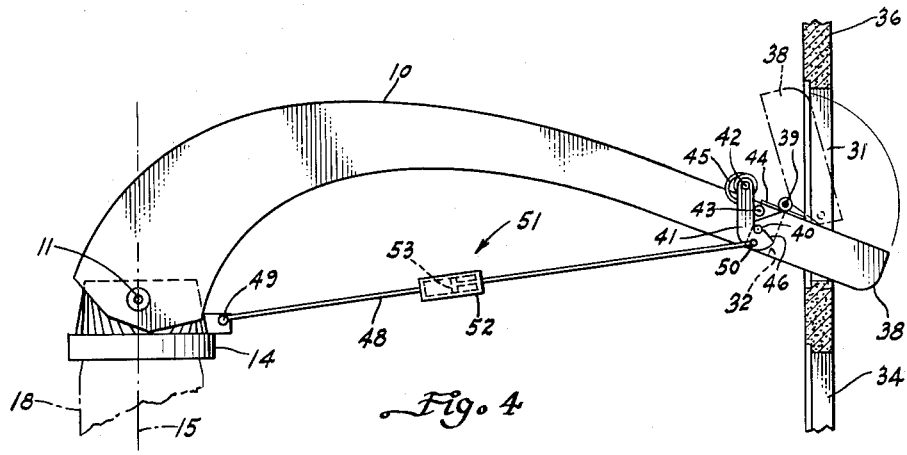
FIG. 4 is a fragmentary elevational view similar to FIG. 3, but showing the mechanism of this invention in still another position.

A first spring 44 is carried by pivot member 39 and biases latch, or spout 38 clockwise as seen in FIGS. 1, 3 and 4. A second spring 45 is carried by pivot member 42 and biases hook 41 counterclockwise as seen in FIGS. 1, 3 and 4. The upturned free end of hook 41 is formed to provide a cam face 46 to facilitate engagement of the hook with pin 40. The springs 44 and 45 serve, respectively, to bias latch member 38 and locking hook 41 into their normally engaged position, as seen in FIG. 1.

A latch releasing rod 48 has one end pivotally connected to support 14 at 49 and the other end pivotally connected to hook 41 at 50. A lost-motion mechanism 51 is preferably incorporated in rod 48. This mechanism may take the form of a cylinder and piston, for example. As shown in the attached drawings, a cylinder 52 may be fixedly attached to the upper end of the lower half of support rod 48 and a piston 53 integrally provided on the lower end of the upper half of rod 48. The purpose of this lost-motion device is to allow a predetermined amount of pivotal movement of conduit 10 about pivot members 11 and 12 before effecting the release of latch member 38 by locking hook 41.

The function of the above mechanism is to enable discharge conduit 10 to automatically move from one discharge opening in the silo wall to the next lower discharge opening in response to a predetermined extent of downward movement of the silo unloader in the silo. FIGS. 1, 3 and 4 show the conduit at three different stages in the process of automatically lowering from one discharge opening 30 to the next lower discharge opening 31. As the silo unloader moves downwardly in the silo from its FIG. 1 position, the conduit 10 is forced to pivot counterclockwise about pivot members 11 and 12 because the rigid latch member 38 is supported on the sill of discharge opening 30. As this pivoting occurs, the rod 48 begins to pull hook 41 in the clockwise direction about pivot member 42. This occurs when the piston 53 of lost-motion device 51 reaches the top limit of cylinder 52. As downward movement of the unloader continues, the parts reach the positions shown in FIG. 3. Here the hook 41 has been pulled free of pin 40 on the spout, or latch member, 38. When this position is reached, the weight of conduit 10 overcomes the relatively light resistance of latch biasing spring 44 and the conduit drops, under the influence of gravity, below the discharge opening 30. This clockwise movement of the conduit about pivot members 11 and 12 relieves the pull on hook 41 by release rod 48. The spring 45 returns the hook 41 to its normally latched position. While the hook is moving through the above steps, the conduit 10 is in the process of dropping below opening 30 in the silo wall. The downward movement of conduit 10 forces latch member 38 to pivot counterclockwise about its mounting member 39 in opposition to the force of biasing spring 44. As soon as latch member 38 drops below the top of opening 31 (the next lower opening below opening 30), the latch member biasing spring 44 returns latch 38 to the position shown in FIG. 1 relative to conduit 10. This movement is shown in FIG. 4. It effects re-engagement of hook 41 with pin 40 to relatch member 38 rigid with conduit 10 and thus supports conduit 10 on the sill of the next lower discharge opening 31. From FIG. 4 it will be seen that the piston 53 of lost-motion mechanism 51 is now located substantially in the center of cylinder 52. When the silo unloader has again moved downwardly enough to move piston 53 to the end of cylinder 52, releasing movement of hook 41 will begin again.

With this invention the farmer is not required to manually lower the relatively heavy discharge conduit 10 from one opening to the next. This operation occurs automatically. The farmer must still climb the silo and remove the doors from the discharge openings; but, as seen in FIG. 1, the discharge spout is three doors higher than the unloader. The farmer may therefore remove three doors at one time, thus requiring only one-third as many trips up the silo.

It should also be noted that if the conduit 10 dropped to a discharge opening from which the door had not been removed, the piston 53 of lost-motion device 51 would come to rest on the lower end of cylinder 52 and prevent the conduit from dropping on down into the path of the silage gathering auger. Obviously, if it were desired, a switch could be mounted at the lower end of cylinder 52 to break the current to motor 34 in the event that the conduit dropped below the lowest open discharge opening.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A silo unloader adapted to be positioned within a silo having a plurality of discharge openings arranged in a vertical column in the side thereof, said silo unloader comprising a support, a conduit having one end pivotally connected to said support and a discharge end disposed adjacent said column of openings, means normally latching said conduit against pivotal movement in at least one direction relative to said support and in such position that said discharge end is directed at one of said openings, means responsive to a predetermined extent of downward movement of said unloader in said silo for releasing said latching means whereupon said conduit is free to pivot relative to said support in said one direction under the influence of gravity whereby said discharge end drops below said one opening, and means responsive to a predetermined extent of pivotal movement of said conduit in said one direction to re-engage said latching means whereby the discharge end of said conduit is directed at the next lower discharge opening below said one opening.

2. Claim 1 wherein said latching means comprises a spout member having one end pivotally mounted on said conduit and the other end resting on the lower edge of said one of the discharge openings and means normally locking said spout member against pivotal movement relative to said conduit.

3. Claim 1 wherein said means responsive to a predetermined extent of downward movement of said unloader in said silo for releasing said latching means comprises an elongate rod member having one end connected to said latching means and the other end connected to said support.

4. Claim 1 wherein said means to re-engage said latching means comprises at least one spring connected to said latching means for returning the latching means to its normally latched position when the discharge end of said conduit drops below said one opening.

5. A silo unloader adapted to be positioned within a silo having a plurality of discharge openings arranged in a vertical column in the side thereof, said silo unloader comprising a support, a conduit mounted on said support for pivotal movement relative thereto about a generally horizontal axis and having a discharge end disposed adjacent said column of discharge openings, a latch member connected to said conduit adjacent the discharge end thereof for movement relative thereto, said latch member extending to said column of openings and having a portion resting on the lower edge of one of said openings, means normally locking said latch member rigid with said conduit for supporting the discharge end thereof on the lower edge of said one of said openings, and means extending from said support to said locking means for releasing said locking means in response to a predetermined extent of pivotal movement of said conduit in one direction relative to said support.

6. Claim 5 wherein means connected to said latch member biases the latch member toward its normally locked position whereby when said locking means is released said conduit drops below said one of said openings and said biasing means returns said latch member to its normally locked position to support the discharge end of said conduit on the lower edge of the next discharge opening below said one opening.

7. A silo unloader adapted to be positioned within a silo having a plurality of discharge openings arranged in a vertical column in the side thereof, said silo unloader comprising a support, a discharge conduit having one end mounted on said support for pivotal movement relative thereto in a generally vertical plane and having a discharge end disposed adjacent said column of discharge openings, a spout mounted on said conduit adjacent the discharge end thereof for pivotal movement relative thereto in a generally vertical plane, means biasing said spout toward a normal position wherein the spout forms an extension of said conduit, means normally locking said spout rigid with said conduit in said normal position whereby the spout rests on the lower edge of one of said discharge openings and supports the discharge end of said conduit thereon, means interconnecting said support and said locking means for releasing the locking means in response to a predetermined extent of downward movement of the unloader in the silo whereby said spout is free to pivot out of its normal position and said conduit is free to pivot relative to said support due to gravity and drop below said one of said openings, said biasing means returning said spout to its normal position when the conduit drops to the next lower opening below said one opening, and means re-engaging said locking means when said spout returns to normal position whereby said spout supports said conduit on the lower edge of said next lower opening.

References Cited in the file of this patent
UNITED STATES PATENTS
3,002,790   Chapman _____ Oct. 3, 1961